March 27, 1962  A. E. ROBERTSON  3,027,304
PROCESS FOR FLUORIDATING WATER
Filed Jan. 8, 1958
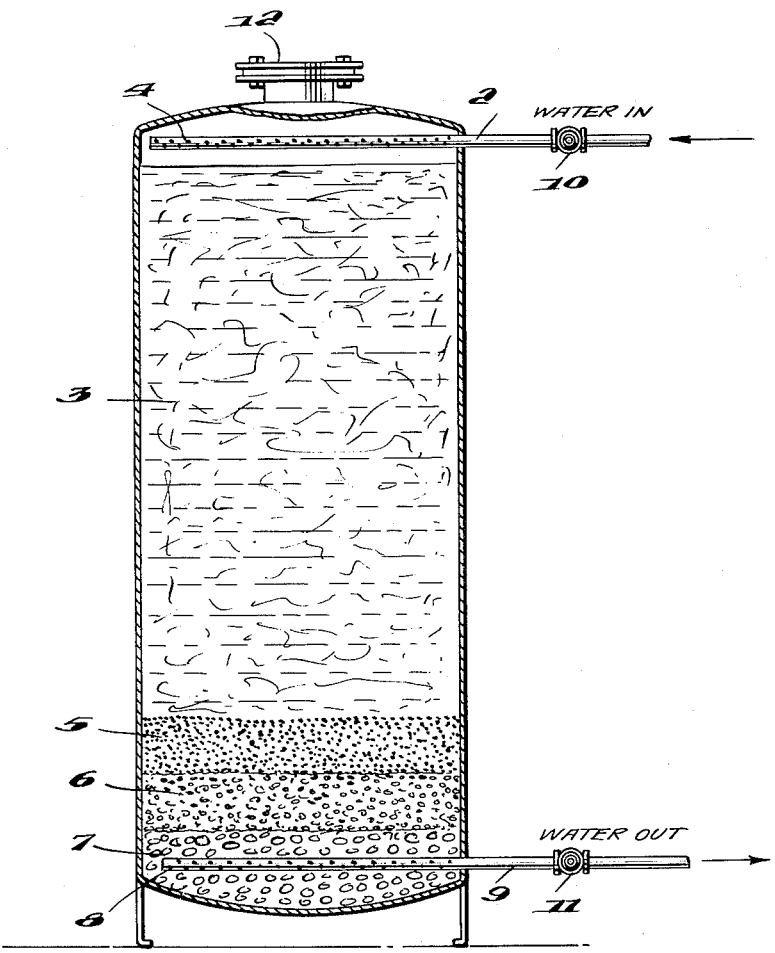
INVENTOR
ANTHONY E. ROBERTSON,
BY *Larson and Taylor*
ATTORNEYS

3,027,304
PROCESS FOR FLUORIDATING WATER
Anthony E. Robertson, Elkton, Md., assignor to Aerial Products, Inc., Elkton, Md., a corporation of Delaware
Filed Jan. 8, 1958, Ser. No. 707,762
4 Claims. (Cl. 167—93)

The invention disclosed herein relates to a process and composition of matter for fluoridating water. More in particular, the instant invention concerns a process wherein a fluoride ion concentration of about 0.5–1.5 parts per million is imparted to potable water supplies for private residences, small buildings, and similar instances of small consumption rate. The instant invention is also a continuation-in-part of my original application entitled "Process for Fluoridating Water" which was filed on September 14, 1956, and assigned Serial No. 610,014, now abandoned.

Until recent years, the fluoride content of potable water supplies came under consideration only in terms of the action of fluoride to produce destructve mottling of teeth. It is now known, however, that the presence of fluorides in potable water supplies within prescribed limits can be helpful in the control of dental caries. A maximum allowable concentration of about 1.5 p.p.m. has been established as desirable for the purposes of dental carie control without the risks attendant upon continued exposure to higher concentrations. As little as 3 to 6 p.p.m. of fluoride, for example, causes unsightly fluorosis of the teeth of growing children under conditions of protracted exposure. Thus, any means of fluoridating potable water supplies must be capable of maintaining a uniform concentration within the safe limit. A number of mechanical and chemical processes have been developed for this purpose within recent years which are capable of adding the small amounts of fluoride ion to water systems having large flow rates, where by necessity fluoride addition is accomplished on a large scale. Fluoridation on a small scale, however, such as with units designed to fluoridate the potable water supplies of a private residence alone, or perhaps one outlet in a building alone, has not been easily accomplished. This is due to the fact that the fluoridation of large water supplies is usually accomplished by metering to the water stream a solution high in fluoride content. While the same process can be used for small water supplies, the time, effort, and technical skill required makes it impractical for the average householder. In addition, there is involved the hazard of getting too much fluoride in the water when concentrated solutions are metered into the water stream.

An object of the instant invention, therefore, is the implementation of a process for fluoridating water wherein uniform control of the fluoride ion concentration within the safe established limits can be assured. A further object is the employment of a process which will operate simply, inexpensively, and with little care and attention. Another object is the employment of a process unit of small, compact size. Additional objects will become apparent from the following.

In accordance with the present invention, the water undergoing fluoridation is brought into equilibrium with a solid fluorine-bearing material of such composition as to impart a fluoride ion concentration within limits of about 0.5–1.5 p.p.m. In a representative embodiment employed herein the fluorine-bearing material is a finely-divided mixture of a calcium-fluoride-bearing material and a calcium phosphate. Calcium-fluoride-bearing materials commonly employed are precipitated calcium fluoride and fluorspar of high calcium fluoride content. Moreover, the phosphate of calcium commonly employed is in the tri-basic or di-basic form. In some cases where the tri-basic form is used, phosphoric acid is added to convert the phosphate to the di-basic form. In such cases the chemistry involved is not well understood and the invention is not dependent upon the actual formation of the di-basic form. In another representative embodiment, a similar mixture of a calcium fluoride-bearing material and a calcium phosphate is employed, the mixture being in the fused state in this instance. Phosphoric acid may or may not be used to convert the tri-basic phosphate to the di-basic form. In a further embodiment the mixture is supported upon a carrier, and may or may not be fused thereupon. The fluorides and phosphates of magnesium can also be used in the process as can mixtures of calcium and magnesium and phosphates.

As disclosed herein, it has been found that the low solubility of calcium fluoride in its various forms can be put to advantageous use, either by suppressing this low solubility even further with another salt or by fusing calcium fluoride with another material to limit its solubility. Unexepectedly, excellent results in terms of providing close control of the fluoride ion concentration during prolonged operational periods are thus obtained. Particularly outstanding results can be obtained with the use of the fused mixtures of calcium fluoride and tri-calcium phosphate, either taken alone or supported on an inert carrier. In the latter case phosphoric acid may or may not be added to convert the tri-calcium phosphate to the di-calcium form.

The mechanism by which the solubility of the calcium fluoride is suppressed is not well understood. In the case of unfused mixtures of calcium fluoride and di- or tri-calcium phosphate, it is postulated that the calcium fluoride is constantly dissolving and at the same time the dissolved calcium fluoride is being removed from solution by reaction with calcium phosphate to form the highly insoluble fluorapatite. A certain concentration of fluoride is then present in the water at all times and this concentration can be controlled by varying the relative amounts of calcium fluoride and calcium phosphate in the solid state. The criticality of the ratio of calcium fluoride to tri-calcium phosphate and di-calcium phosphate is illustrated in Tables 1 and 2. The ratio of fluoride to phosphate that will give 1 p.p.m. fluoride in the water is a function of the relative rates at which the two materials dissolve and hence varies widely depending on the surface areas or particle sizes of the materials used. In the case of fused mixtures the mechanism is believed to be one of physical blocking in which the calcium fluoride is dispersed in a slightly soluble material and can dissolve only as fast as the solution of the other material exposes it to the action of the water.

The above discussed mechanisms are advanced for purposes of clarification only, the invention being independent of any presumed mechanisms.

TABLE I

*Concentration of Fluoride in Water in Equilibrium With Mixtures of Calcium Fluoride and Tri-calcium Phosphate*

| Wt. Percent Calcium Fluoride in Tri-calcium Phosphate | Approximate Equilibrium, Amount of Fluoride in Water, p.p.m. |
|---|---|
| 5 | 0.3 |
| 10 | 0.8 |
| 12 | 1.0 |
| 15 | 1.3 |
| 20 | 1.9 |

TABLE II

*Concentration of Flouride in Water in Equilibrium With Mixtures of Calcium Fluoride and Di-calcium Phosphate*

| Wt. Percent Calcium Fluoride in Di-Calcium Phosphate | Approximate Equilibrium, Amount of Fluoride in Water, p.p.m. |
|---|---|
| 10 | 0.2 |
| 20 | 0.4 |
| 30 | 0.7 |
| 40 | 0.9 |
| 42 | 1.0 |
| 50 | 1.3 |
| 60 | 1.8 |

In one of the preferred forms of the invention, precipitated calcium fluoride is mixed with tri-calcium phosphate. Sufficient water is added to form a thick slurry which is stirred until free from lumps. Upon drying of the slurry, the cake is broken up and fused. The fused mixture is then ground into a finely-divided state and charged into a small fluoridation vessel of the type shown herein. Extended periods of fluoridation show a fluoride content ranging nominally between 0.5 and 1.5 p.p.m. of the effluent water where the water flow rate does not exceed that which will permit the attainment of essential equilibrium between the water and the chemicals in the bed. The term "precipitated calcium fluoride," as used in this specification, refers to a finely-divided reagent-grade material of 99% plus purity made by precipitating a soluble fluoride salt with a calcium salt. Powdered fluorspar, a ground native rock, can be substituted for the precipitated calcium fluoride in some cases. Fluorspar of 97% calcium fluoride content is essentially equivalent to precipitated calcium fluoride of 99% plus purity for purposes of fusing with tri-calcium phosphate. This fact is quite important, since the price of precipitated calcium fluoride ranges many times higher than that of acid-grade fluorspar. Pure NF grade tri-calcium phosphate (made to the specifications of the National Formulary) is usually employed although in some cases it is feasible to use less pure forms of calcium phosphate such as stock food grade di-calcium phosphate and phosphate rock.

In another preferred embodiment, the mixture of calcium fluoride and tri-calcium phosphate is supported upon a carrier and fused thereupon. In this case, after the mixture has been wetted with water to form a slurry and stirred until free from lumps, a carrier such as activated alumina is added to the slurry. Again the slurry is agitated until the alumina particles are uniformly coated. The mixture is then dryed and fused in a kiln at temperatures ranging upward of 1200° C. At this point, the fused material can be treated with a solution of phosphoric acid to convert the calcium phosphate to the dibasic form, or the step can be omitted. The resultant fused material is charged into a small fluoridation vessel of the type shown herein and exposed to water passing at a space velocity such that the capacity of the bed is not exceeded. The space velocity, that is the volume of water per volume of chemical per minute, employed may be as high as 0.30, depending on the nature of the chemical and the pressure drop that can be tolerated. In addition to the activated alumina employed above, other inert carriers such as calcined alumina, diatomaceous earth, montmorillonite clay, silica, silica gel, and tabular alumina can be used. Charcoal and many other materials can be used for cases where the active chemical is not fused on the carrier.

For the purposes of illustration only, the following examples are submitted:

EXAMPLE I

Twenty-two grams of precipitated calcium fluoride was mixed with 178 grams of tri-calcium phosphate. Water was added to form a thick slurry which was stirred until free from lumps. The slurry was dried and the dried cake broken up and fused by an oxyacetylene flame. The fused mixture was ground to 80–170 mesh and charged into a small fluoridation vessel. Water was passed at a space velocity (volume of water/volume of chemical/minute) of 0.1 continuously for 142 days. During this time the fluoride content of the effluent water was determined 58 times at regular intervals. The average value obtained was 1.03 p.p.m. with a standard deviation[1] of 0.20 p.p.m. There was no evidence of exhaustion of the chemical at the end of this period.

EXAMPLE II

A mixture consisting of 26 grams of precipiated calcium fluoride and 174 grams of tri-calcium phosphate was wet with water to form a thick slurry which was stirred until free from lumps. The slurry was dried and the dried cake broken up and fused by an oxyacetylene flame. The fused mixture was ground to 80–170 mesh and charged into a small fluoridation vessel. Water was passed at a space velocity (vol. of water/vol. of chemical/minute) of 0.1 continuously for 142 days. During this time the fluoride content of the effluent water was determined 58 times at regular intervals. The mean value obtained was 1.30 p.p.m. with a standard deviation of 0.20 p.p.m. There was no indication of exhaustion of the chemical at the end of this period.

EXAMPLE III

A mixture of powder consisting of 12 percent precipitated calcium fluoride in tri-calcium phosphate was fused by heating to about 1400° C. in a kiln. The fused mass was ground and screened to 40–80 mesh. Water brought to equilibrium with this material was found to have a fluoride content of about 1 p.p.m. This material was charged into a fluoridation vessel wherein water flowed through a bed of the material. At a space velocity of 0.15, the effluent water was found to have a fluoride content of 0.9 p.p.m.

EXAMPLE IV

Acid grade fluorspar of about 97 percent calcium fluoride content was ground in a ball mill to an average particle size of 1.65 microns. Twenty-four grams of this material was mixed with 176 grams of tri-calcium phosphate. Water was added to form a slurry which was stirred until it was free from lumps. The mixture was dried and fused in an oxyacetylene flame. The fused mixture was ground to 80–170 mesh and charged into a small fluoridation vessel. Water was passed at a space velocity of 0.14 for a period of 103 days. During this time the concentration of fluoride in the effluent water was determined 41 times at regular intervals. The average value obtained was 1.07 p.p.m. with a standard deviation of 0.27 p.p.m. There was no evidence of exhaustion of the chemical at the end of this period.

---

[1] Standard deviation is a commonly used measure of dispersion. See "The World of Mathematics," John R. Newman, vol. 3, pp. 1508–1510, Simon and Schuster, New York, 1956.

EXAMPLE V

Thirty grams of precipitated calcium fluoride was mixed with 22.8 grams of tri-calcium phosphate. The mixture was wet with water to form a slurry which was stirred until free from lumps. To this slurry was added 150 ml. (119.3 grams) of 80–170 mesh activated alumina. The mixture was stirred until the slurry uniformly coated the alumina. The mixture was then dried and fused in a kiln at 1600° C. To the fused material was added 47.6 ml. of a solution of phosphoric acid containing 150.3 grams of acid per liter. This mixture was stirred for 2 hours and then dried in an oven. The dried material was charged into a small fluoridation vessel and water passed at a space velocity of 0.11 for 163 days. During this time the effluent water was analyzed for fluoride content 64 times at regular intervals. The average value obtained was 1.01 p.p.m. with a standard deviation of 0.22 p.p.m. At the end of this period the chemical gave no indication of exhaustion.

EXAMPLE VI

A mixture of precipitated calcium fluoride and tri-calcium phosphate was wet with enough water to form a slurry. Tabular alumina, 14–28 mesh, was added to the slurry and stirred to obtain a uniform coating of the slurry on the alumina. The material was dried and fused in a kiln at about 1400° C. The material was then allowed to react with sufficient phosphoric acid to convert the tri-calcium phosphate to di-calcium phosphate. The active chemical was calculated to consist of 50 percent by weight calcium fluoride in di-calcium phosphate. The material consisted of 10 percent by weight active chemical and 90 percent by weight alumina. Water brought into equilibrium with this material contained about 0.9 p.p.m. fluoride.

EXAMPLE VII

Thirty grams of precipitated calcium fluoride was mixed with 90 grams of tri-calcium phosphate and water added to form a slurry which was stirred until free from lumps. To this slurry was added 300 ml. (203.7 grams) of 80–170 mesh silica gel. This was stirred until the slurry uniformly coated the gel. The material was dried and fused at 1200° C. The fused material was charged into a small fluoridation vessel and water passed at a space velocity of 0.12 for a period of 70 days. During this period the effluent water had a fluoride content ranging nominally between 0.6–1.2 p.p.m. without any evidence of exhaustion of the chemical at the end of this period.

It has been found that where the fused mixture is unsupported about 9–17% by weight of calcium fluoride in the mixture provides excellent results. Where the fused mixture is supported on a carrier, the best results are obtained with about 10 to 60 grams of active chemical per 100 ml. of carrier. Initially, where the mixture is supported on a carrier and where phosphoric acid is used to convert the phosphate to the di-basic form, the active mixture ideally contains 35–85% by weight of calcium fluoride. Where the acid is not employed, the active mixture ideally contains 15–40% by weight of calcium fluoride.

Fluoride ion can also be introduced to potable waters within prescribed limits through the use of an unfused mixture of a material of high calcium fluoride content and a salt from the group consisting of phosphates, sulfates, carbonates, and iodates of calcium. In this instance, the mixture is composed of such amounts of each constituent as to bring the water into equilibrium with the mixture at the desired concentration. Thus, the fluoride content imparted to the water is dependent on the composition of the mixture. For example, a mixture containing 5–20% by weight of precipitated calcium fluoride with pure NF grade tri-calcium phosphate is capable of attaining a concentration of fluoride ion within the desired limits. Similarly, a mixture of the calcium fluoride with pure di-calcium phosphate containing about 20–60% of the fluoride provides the desired concentration. The invention is not limited to phosphates, however, since about 0.1–5.0% by weight of the fluoride with calcium iodate, 0.01–1.0% by weight of the fluoride with calcium sulfate, and 0.001–0.1% by weight of the fluoride with calcium carbonate, when brought into equilibrium with potable water leave concentrations within the desired limits. Ground phosphate rock, calcined phosphate rock, and ground fluorspar have also proven to be useful for the purposes disclosed herein. These unfused mixtures, like the ground fused mixture, can be supported upon a carrier.

Reference is made to the drawing herein to show a fluoridation vessel representative of the type which can be used to introduce fluoride ion to small water supplies in the manner disclosed herein. The drawing shows a cylindrical tank of 20–30 gallon capacity wherein the fluoridating mixture in bulk is supported by underlying layers of sand and several grades of gravel. Gravity flow through the tank is permitted, although normally pressure flow would be employed. Water enters the tank at the top, flows downward, and leaves the tank at the bottom through some common means of effluent collection. The layers of sand and gravel can be of depths common to water filtration tanks, the remainder of the tank depth, such as 24–38 inches, containing the fluoridating agent. In an illustrative form, the fluoridation tank is 12 inches in diameter and 48 inches in height. Such a tank has a capacity of about 23.5 gallons. As shown in the drawing, the fluoridation tank is installed at some point in the piping system such that potable water enters the tank at the top through inlet line 2, and is distributed over the surface of the bed 3 of fluoridation agent, through orifices 4. Moving under pressure and in a downward direction through the bed 3, the water comes into equilibrium with the fluoridation agent to leave a fluoride ion concentration within the desired limits. Upon passing the bed 3, the water descends through successive layers of filter sand 5, fine gravel 6, and coarse gravel 7, to be collected through orifices 8 of the outlet line 9, and thence to continue on its way in the water system. Valves 10 and 11, installed on the influent and effluent sides of the fluoridation vessel respectively, provide means of controlling flow in the tank for cleaning and recharging purposes. Access to the interior of the tank is gained through 12.

Such a tank is small and compact in size, and can be installed with little difficulty along the service line leading into a private residence or at some point within the piping system of the building. The fluoridating system thus installed requires virtually no care or attention, in that only infrequent testing of the fluoride content in the water supply need be made to determine when to recharge the tank with fluoridating agent. At the same time, the fluoridation system is completely reliable and safe, in that with dissipation of the fluoridation agent the fluoride ion concentration will normally decrease. Thus, there is virtually no risk of super-fluoridating the water.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A process for adding fluoride, within the range of about 0.5 to 1.5 p.p.m., to fluoride free water, which comprises; passing said fluoride free water into equilibrium with a finely divided fused solid mixture of 9% to 17% by weight of calcium fluoride in tricalcium phosphate.

2. A process as claimed in claim 1, wherein said fused mixture is supported on a carrier.

3. A process for adding fluoride within the range of about 0.5 to 1.5 p.p.m. to fluoride free water, which comprises; passing said fluoride free water into equilibrium with a finely divided fused solid mixture consisting of 20% to 50% by weight of calcium fluoride in dicalcium phosphate.

4. A process according to claim 3 wherein said fused mixture is supported on a carrier.

References Cited in the file of this patent

UNITED STATES PATENTS

| | | |
|---|---|---|
| 2,126,793 | MacIntire | Aug. 16, 1938 |
| 2,361,444 | Zbornik | Oct. 31, 1944 |
| 2,671,755 | Anderson | Mar. 9, 1954 |

FOREIGN PATENTS

| | | |
|---|---|---|
| 3,034 | Great Britain | Feb. 5, 1915 |

OTHER REFERENCES

MacIntire et al.: Ind. and Eng. Chem., 30:2, February 1938, pp. 160–162.